(12) United States Patent
Barmeier et al.

(10) Patent No.: US 10,712,096 B2
(45) Date of Patent: Jul. 14, 2020

(54) METHOD FOR OPERATING A HEAT EXCHANGE SYSTEM WITH A BYPASS DUCT AND HEAT EXCHANGE SYSTEM WITH A BYPASS DUCT

(71) Applicant: Siemens Gamesa Renewable Energy A/S, Brande (DK)

(72) Inventors: Till Andreas Barmeier, Hamburg (DE); Volker Seidel, Barcelona (ES); Jennifer Verena Wagner, Hamburg (DE)

(73) Assignee: Siemens Gamesa Renewable Energy A/S (DK)

( * ) Notice: Subject to any disclaimer, the term of this patent is extended or adjusted under 35 U.S.C. 154(b) by 0 days.

(21) Appl. No.: 15/802,603

(22) Filed: Nov. 3, 2017

(65) Prior Publication Data
US 2018/0142959 A1    May 24, 2018

(30) Foreign Application Priority Data

Nov. 23, 2016    (DE) .......................... 10 2016 223 217

(51) Int. Cl.
*G05D 15/00* (2006.01)
*F28D 7/00* (2006.01)
(Continued)

(52) U.S. Cl.
CPC ........ *F28D 7/0041* (2013.01); *F28D 20/0056* (2013.01); *F28F 27/02* (2013.01);
(Continued)

(58) Field of Classification Search
CPC ......... F28D 20/0056; F28D 2020/0069; Y02E 60/142
(Continued)

(56) References Cited

U.S. PATENT DOCUMENTS 5,246,061 A * 9/1993 Zalite .................. B64G 1/50
165/10
2008/0022683 A1 1/2008 Ohler et al.
(Continued)

FOREIGN PATENT DOCUMENTS

CN          105318757 A    2/2016
DE            3209642 A1   10/1982
(Continued)

OTHER PUBLICATIONS

Extended European Search Report dated Apr. 18, 2018, Application No. 17194890.4.

*Primary Examiner* — Davis D Hwu
(74) *Attorney, Agent, or Firm* — Schmeiser, Olsen & Watts LLP

(57) ABSTRACT

A method for operating a heat exchange system is provided. The heat exchange system includes at least one heat exchange chamber with heat exchange chamber boundaries which surround at least one heat exchange chamber interior of the heat exchange chamber, wherein the heat exchange chamber boundaries comprise at least one first opening for guiding in an inflow of at least one heat transfer fluid into the heat exchange chamber interior and at least one second opening for guiding out an outflow of the heat transfer fluid out of the heat exchange chamber interior, at least one heat storage material is arranged in the heat exchange chamber interior such that a heat exchange flow of the heat transfer fluid through the heat exchange chamber interior causes a heat exchange between the heat storage material and the heat transfer fluid.

13 Claims, 3 Drawing Sheets

(51) Int. Cl.
*F28F 27/02* (2006.01)
*F28D 20/00* (2006.01)

(52) U.S. Cl.
CPC ............... *F28D 2020/0013* (2013.01); *F28D 2020/0065* (2013.01); *F28F 2250/06* (2013.01); *F28F 2265/10* (2013.01); *Y02E 60/142* (2013.01)

(58) Field of Classification Search
USPC .......................................... 165/10, 103, 283
See application file for complete search history.

(56) References Cited

U.S. PATENT DOCUMENTS

| | | |
|---|---|---|
| 2013/0126122 A1 | 5/2013 | Schneider et al. |
| 2015/0292771 A1 | 10/2015 | Varga |
| 2017/0276435 A1 | 9/2017 | Papadopoulos et al. |
| 2017/0363368 A1 | 12/2017 | Bergan et al. |

FOREIGN PATENT DOCUMENTS

| | | |
|---|---|---|
| DE | 202010015153 U1 | 3/2011 |
| DE | 102011050200 A1 | 11/2012 |
| DE | 202012103544 U1 | 12/2013 |
| EP | 1577548 A1 | 9/2005 |
| EP | 2916092 A1 | 9/2015 |
| WO | WO 2012017041 A2 | 2/2012 |
| WO | WO 2014072952 A1 | 5/2014 |
| WO | WO 2016050365 A1 | 4/2016 |
| WO | WO 2016099290 A1 | 6/2016 |

\* cited by examiner

METHOD FOR OPERATING A HEAT EXCHANGE SYSTEM WITH A BYPASS DUCT AND HEAT EXCHANGE SYSTEM WITH A BYPASS DUCT

CROSS-REFERENCE TO RELATED APPLICATIONS

This application claims priority to German application No. 10 2016 223217.7, having a filing date of Nov. 23, 2016, the entire contents of which are hereby incorporated by reference.

FIELD OF TECHNOLOGY

The following refers to a method for operating a heat exchange system with a bypass duct and heat exchange system with a bypass duct.

BACKGROUND

It is a state of the art solution to store fluctuating electrical energy from renewable energies as heat inside heat storages in order to reconvert it back to electrical energy in times when the demand is higher than the production. These heat storages are usually part of thermal energy storage plants which additionally can comprise a heater device, a steam generator, a steam turbine, a heat transporting fluid, a storage material, and a piping system, see FIG. 1. In order to achieve high efficiency of the heat-to-power cycle, the steam generator should be operated with temperatures of at least 600° C. As a result, the heat storage has to be charged with temperatures higher than 600° C. because of heat losses during operation and, in case of horizontal heat storage, the mixing of the temperature profile inside the heat storage due to natural convection.

Due to thermal losses and the influence of natural convection the temperature of the heat transporting fluid is lower during discharging than during the charging process. This effect is especially relevant for long downtimes of the system. To compensate for this temperature loss, the charge temperature is elevated. The ducting between the thermal storage and the steam generator is stressed by the high temperature of the hot fluid. If it needs to be designed for temperatures higher than 600° C. the costs rise strongly, because high thermal resistant material needs to be used. Hence the possible temperature increase needs to be as low as possible to limit the additional expenditure.

Because the installation cost for thermal energy storage plants needs to be as low as possible in order to be able to make profit, the use of custom products should be kept at a minimum level.

A second effect is the drop of the discharge temperature during the discharge cycle. The discharge temperature drops down after approximately 40% of the discharge time, see FIG. 2. The steam cycle is designed for a certain feed in temperature and if this temperature reduces the gas and water flow need to be controlled to either keep a certain enthalpy flow or to reduce the discharge power. This is possible up to a level where the steam quality is too low for the designed steam cycle. Hence the discharge cycle needs to be stopped.

SUMMARY

An aspect relates to a high temperature heat exchange system which avoids the above described disadvantages.

For solving the problem a method for operating a heat exchange system is provided. The heat exchange system comprises at least one heat exchange chamber with heat exchange chamber boundaries which surround at least one heat exchange chamber interior of the heat exchange chamber, wherein the heat exchange chamber boundaries comprise at least one first opening for guiding in an inflow of at least one heat transfer fluid into the heat exchange chamber interior and at least one second opening for guiding out an outflow of the heat transfer fluid out of the heat exchange chamber interior, at least one heat storage material is arranged in the heat exchange chamber interior such that a heat exchange flow of the heat transfer fluid through the heat exchange chamber interior causes a heat exchange between the heat storage material and the heat transfer fluid. During a charging process with a heat transfer from the heat transfer fluid to the heat storage material a heat transfer fluid of more than 700° C. is used. Preferably, a heat transfer fluid (13) of more than 750° C. is used.

The novelty of embodiments of this invention is the increased charge temperature to compensate the temperature drop during discharge and the control of the discharge temperature with fluid of the cold end bypassing the thermal heat exchange chamber. By this measure the discharge temperature is maintained constant until it falls below the design temperature of the steam generator. In this case the steam generator can be designed appropriately to the constant discharge properties of the heat transfer fluid. Hence less control action of the steam generator is required and the design for a certain operation point leads to increased efficiency, since the system does not need to cover a broad operation range. Then the components can be adjusted and designed to this operation point to work at this design point with high efficiency.

Furthermore the energy density of the thermal exchange system is increased and the heat exchange chamber can be designed smaller.

The thermal insulation needs to be increased to reduce the additional thermal losses that stem from the higher temperature difference between the storage material and the ambient.

This higher effort is overcompensated by the advantages of the longer discharge time and the efficiency increase of the steam generator that can be designed for a certain design point.

The additional installation and cost effort for the bypass and the additional damper or valve is relatively low since the fluid guided through the bypass is relatively cold. The gas path needs to be designed to max 25% of the main mass flow of the system. This part of the piping can be realized with externally insulated pipes that resist e.g. 250° C.

With this system the power production is maintained constant during the discharge cycle and this increases the operation possibilities of such a thermal storage in different energy markets such as spot market or ancillary services such as reserve power.

In a preferred embodiment, during a discharging mode with a heat transfer from the heat storage material to the heat transfer fluid a mixing of the heat transfer fluid coming from the heat exchange chamber interior with heat transfer fluid coming from a bypass piping system of the heat exchange chamber is carried out. In a preferred embodiment, by the mixing a temperature of the resulting heat transfer fluid of less than 700° C. and preferably of less than 650 results. Preferably, for the mixing a heat transfer fluid coming from the bypass duct of less than 300° C. and preferably less than 250° C. is used. For instance, this heat transfer fluid comprises a temperature of about 200° C.

In addition to the method, a respective heat exchange system is provided with at least one heat exchange chamber with heat exchange chamber boundaries which surround at least one heat exchange chamber interior of the heat exchange chamber, wherein the heat exchange chamber boundaries comprise at least one first opening for guiding in an inflow of at least one heat transfer fluid into the heat exchange chamber interior and at least one second opening for guiding out an outflow of the heat transfer fluid out of the heat exchange chamber interior, at least one heat storage material is arranged in the heat exchange chamber interior such that a heat exchange flow of the heat transfer fluid through the heat exchange chamber interior causes a heat exchange between the heat storage material and the heat transfer fluid, at least one bypass duct for piping the heat transfer fluid without guided through the exchange chamber interior, and at least one fluid mixing station for mixing the heat transfer fluid coming from the heat exchange chamber interior and heat transfer fluid which is piped through the bypass duct.

In a preferred embodiment, the fluid mixing station comprises at least on valve.

The heat exchange chamber is a space, cavity or a housing in which the heat storage material is located. Inside of the heat exchange chamber the heat exchange takes place. The heat storage material comprises preferably sand and/or stones. In addition, the heat transfer fluid comprises preferably a gas at ambient gas pressure. The gas at ambient gas pressures is preferably air.

The heat transfer fluid is guided (led) into the heat exchange chamber interior via the first opening and is guided out of the heat exchange chamber interior via the second opening. The first opening of the heat exchange chamber boundaries is an inlet opening. The second opening of the heat exchange chamber boundaries is an outlet opening. Thus, there are different areas of the heat exchange chamber boundaries, namely an inlet area of the heat exchange chamber boundaries with the first opening and an outlet area of the heat exchange chamber boundaries with the second opening.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposed to each other (countercurrent operation). But, a change of the directions of the heat exchange flow is not necessary. Charging mode direction and discharging mode direction comprise the same direction (co-current operation).

In countercurrent operation, switching from the charging mode to the discharging mode the direction of the heat exchange flow through the heat exchange chamber interior is reversed and consequently, the function of the openings (inlet opening, outlet opening) is reversed, too. With such a solution it is especially advantageous to use the same heat transfer fluid for the charging mode and for the discharging mode. But of course, different heat transfer fluids for the charging mode and the discharging mode can be used, too.

For the charging mode, the heat exchange system is equipped with at least one charging unit for heating the heat transfer fluid. In the charging mode with activated charging unit, the charging unit can be located upstream of the heat exchange chamber. In contrast to that, in the discharging mode with a deactivated charging unit, the charging unit can be located downstream of the heat exchange chamber.

Preferably, the charging unit comprises at least one electrical heating device which is selected from the group consisting of resistance heater, inductive heater, emitter of electromagnetic radiation and heat pump. The electromagnetic radiation is preferably infrared radiation. A combination of different electrical heating devices is possible. With the aid of the electrical heating devices electricity is transformed into heat. This heat is absorbed by the heat transfer fluid and transported to the heat storage material in the heat exchange chamber interior.

Preferably, the heat exchange system is equipped with at least one discharging unit for discharging the heat transfer fluid of the outflow from heat for production of electricity. The discharging unit comprises at least one steam cycle.

The heat exchange system is preferably a high temperature heat exchange system.

So, thermal energy can be stored at high temperatures. So, an operating temperature of the operating mode is preferably selected from the range between 300° C. and 1000° C., more preferably selected from the range between 500° C. and 1000° C., more preferably selected from the range between 600° C. and 1000° C. and 650° C. to 1000° C. and most preferably selected from the range between 700° C. and 1000° C.

BRIEF DESCRIPTION

Some of the embodiments will be described in detail, with reference to the following figures, wherein like designations denote like members, wherein.

DETAILED DESCRIPTION

Figure 1:
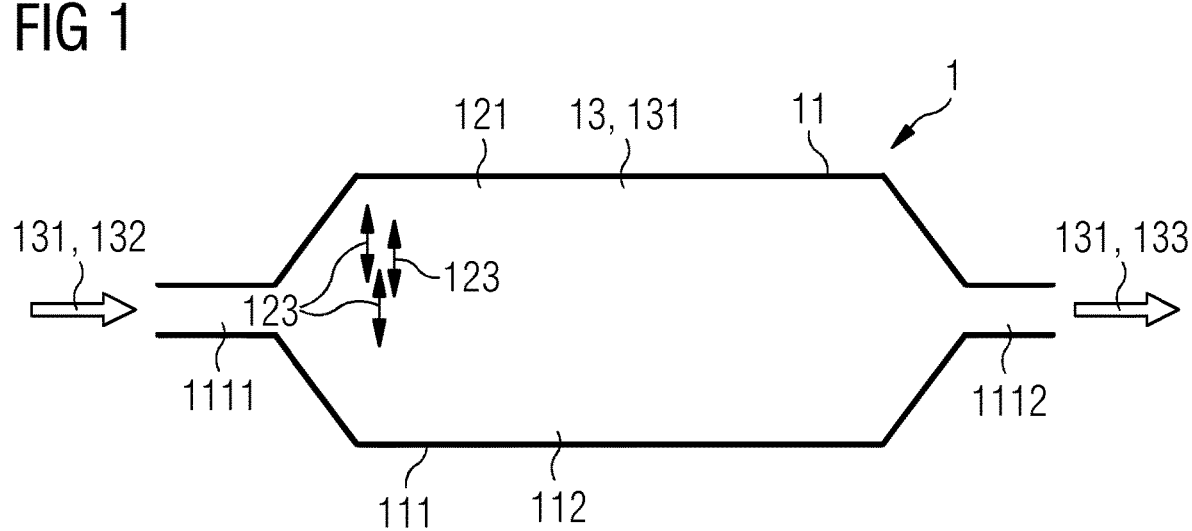
FIG. 1 shows a heat exchange chamber of the heat exchange system.

The disclosed refers to a heat exchange system 1 with a heat exchange chamber 11 on a high temperature level.

With the aid of the proposed heat exchange system 1, thermal energy can be stored on a high temperature level during the charging mode. This stored thermal energy can be used during the discharging mode for the production of steam in a water steam cycle for reconversion into electrical energy.

The heat exchange system 1 comprises at least one heat exchange chamber 11 with heat exchange chamber boundaries 111 which surround at least one heat exchange chamber interior 112 of the heat exchange chamber 11.

The heat exchange chamber boundaries 111 comprise at least one first opening 1111 for guiding in an inflow 132 of at least one heat transfer fluid 131 into the heat exchange chamber interior 112 and at least one second opening 1112 for guiding an outflow 133 of the heat transfer fluid 131 out of the heat exchange chamber interior 112. At least one heat storage material 121 (sand or stones) is arranged in the heat exchange chamber interior 112 such that a heat exchange flow 13 of the heat transfer fluid 131 through the heat exchange chamber interior 112 causes a heat exchange between the heat storage material 121 and the heat transfer fluid 131.

Exemplarily, the heat exchange chamber length of the horizontal heat exchange chamber 11 is about 200 m, the heat exchange chamber height of the heat exchange chamber 11 is about 10 m and the heat exchange chamber width of the heat exchange chamber is about 50 m.

Figure 2:
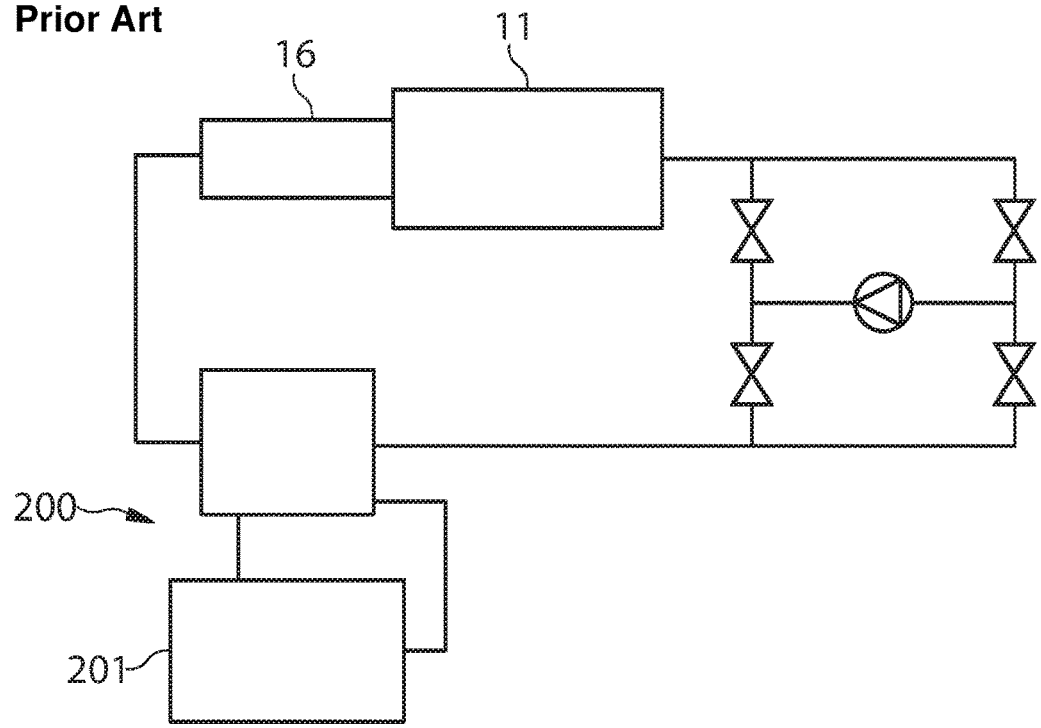
FIG. 2 shows state of the art.
Figure 4:
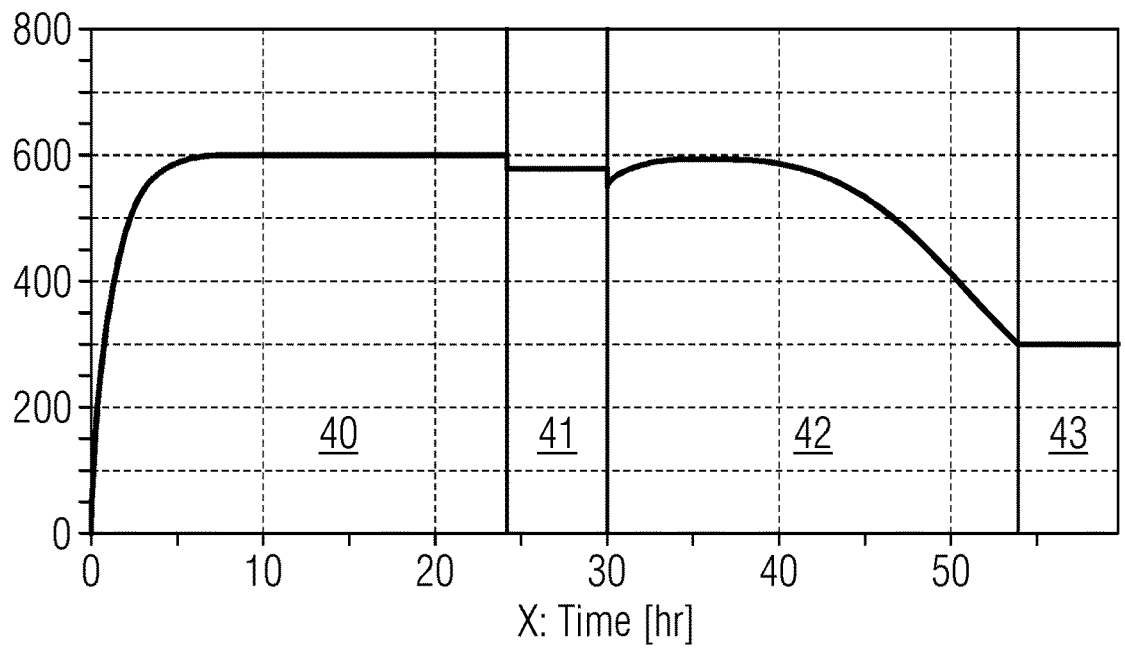
FIG. 4 shows the temperature profile of a hot end of the heat exchange chamber during different operation modes concerning the state of the art.

Looking at FIG. 2 the state of the art is described. Without the bypassing of the heat exchange chamber a dropping of the temperature of the heat transfer fluid during the discharging cycle (discharging mode) occurs (see FIG. 4). The heat exchange chamber is charged with heat transfer fluid of about 600 C resulting in a temperature of the heat exchange chamber of about 600° C. (reference 41). During a downtime period (reference 41) the temperature of the heat exchange chamber is stable. During the discharge cycle the temperature of the heat exchange change drops (reference 42) After the discharge cycle a further downtime period with a stable temperature of the heat exchange chamber follows (reference 43)

Figure 5:
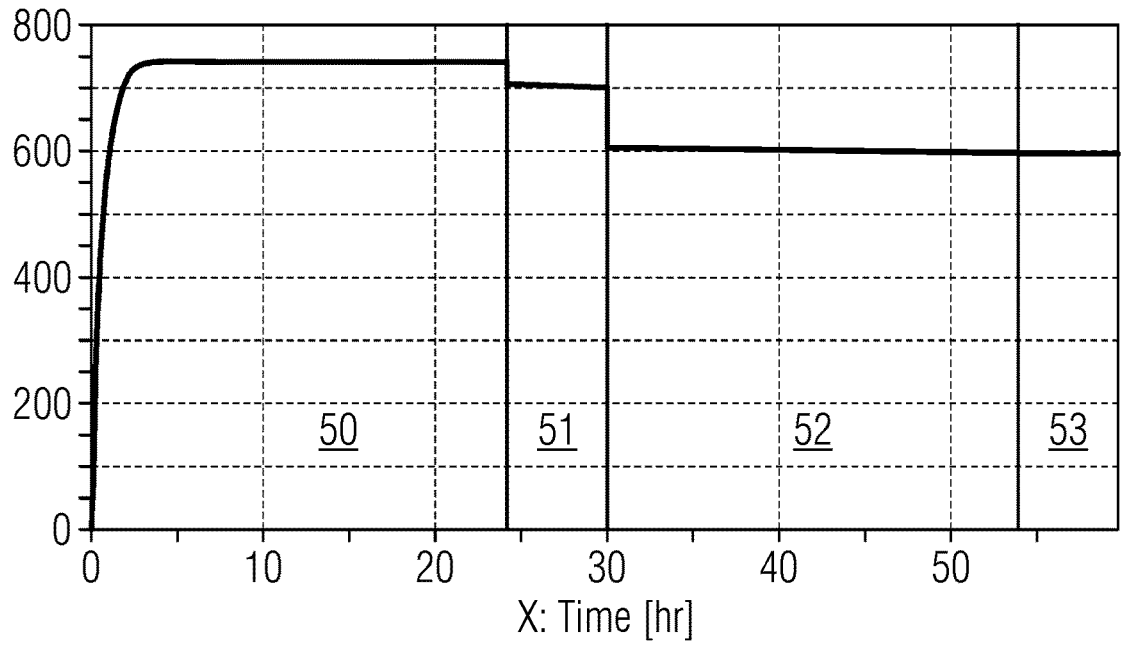
FIG. 5 shows the respective temperature profile concerning embodiments of the invention.

With embodiments of the invention, the heat exchange chamber is heated up to about 750° C. during the charging mode (FIG. 5, reference 50). Again, after the charging cycle a downtime period of stable temperature follows (reference 51). During the discharge period 52 the temperature of the heat exchange chamber remains constant (reference 52) as well as during a subsequent downtime period (reference 53).

Figure 3:
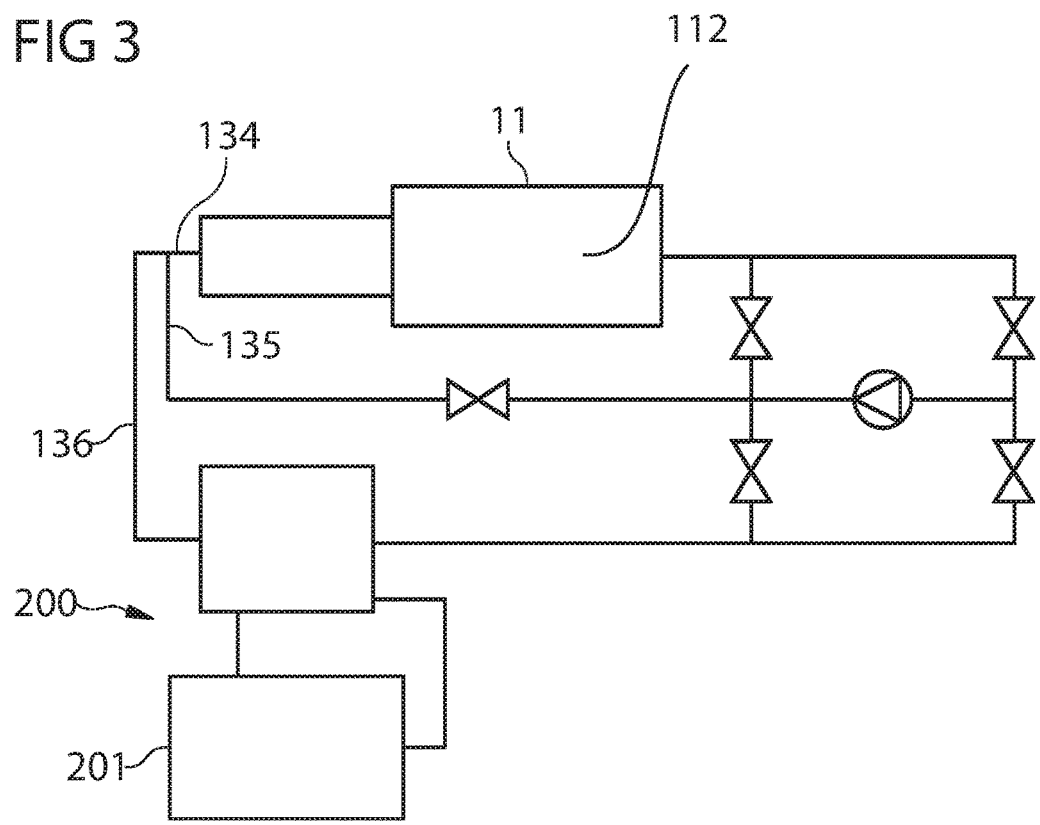
FIG. 3 shows embodiments of the invention.

FIG. 3 shows an embodiment of the invention. At that high temperature, heat transfer fluid leaves the heat exchange chamber 11 during the discharging mode. This hot heat transfer fluid 134 coming from the heat exchange chamber interior 112 is mixed with relatively cold heat transfer fluid 135 of about 200° C. which bypasses the heat exchange chamber 111 and the heat exchange chamber interior 112. This results in a mixed heat transfer fluid 136 with a temperature of about 600°. With his temperature, the heat transfer fluid 136 can be used of the steam cycle 201 of the discharging unit (discharging cycle) 200.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for operating a heat exchange system with:
at least one heat exchange chamber with heat exchange chamber boundaries which surround at least one heat exchange chamber interior of the heat exchange chamber, wherein
the heat exchange chamber boundaries include at least one first opening for guiding in an inflow of at least one heat transfer fluid into the at least one heat exchange chamber interior during a charging process and at least one second opening for guiding out an outflow of the at least one heat transfer fluid out of the at least one heat exchange chamber interior during a charging process, wherein the at least one second opening is used for guiding in an inflow of the at least one heat transfer fluid into the at least one heat exchange chamber interior and the at least one first opening is used for guiding out an outflow of the at least one heat transfer fluid out of the at least one heat exchange chamber interior during a discharging process;
at least one heat storage material is arranged in the at least one heat exchange chamber interior such that a heat exchange flow of the at least one heat transfer fluid through the at least one heat exchange chamber interior causes a heat exchange between the at least one heat storage material and the at least one heat transfer fluid;
at least one bypass piping system capable of guiding bypass heat transfer fluid outside the heat exchange chamber interior during the discharging process; and
at least one fluid mixing station for mixing the at least one heat transfer fluid coming from the heat exchange chamber interior during the discharging process and the bypass heat transfer fluid coming from the bypass piping system during the discharging process;
wherein
during the charging process with a heat transfer from the at least one heat transfer fluid to the at least one heat storage material a heat transfer fluid of more than 700° C. is used;
during the discharging process with a heat transfer from the at least one heat storage material to the at least one heat transfer fluid, a discharge temperature of discharged transfer fluid is controlled to be maintained constant until the discharge temperature falls below a design temperature, wherein the control to be maintained constant is carried out by mixing of the at least one heat transfer fluid coming from the at least one heat exchange chamber interior with the bypass heat transfer fluid coming from the bypass piping system having a temperature that is less than the temperature of the at least one heat transfer fluid coming from the at least one heat exchange chamber interior.

2. The method according to claim 1, wherein a heat transfer fluid of more than 750° C. is used.

3. The method according to claim 1, wherein the design temperature of the steam generator is at least 600° C.

4. The method according to claim 3, wherein by the mixing a temperature of a resulting heat transfer fluid of less than 700° C. results.

5. The method according to claim 4, wherein for the mixing the bypass heat transfer fluid coming from the bypass piping system has a temperature of less than 300° C.

6. A heat exchange system, comprising:
at least one heat exchange chamber with heat exchange chamber boundaries which surround at least one heat exchange chamber interior of the at least one heat exchange chamber, wherein
the heat exchange chamber boundaries comprise at least one first opening for guiding in an inflow of at least one heat transfer fluid into the at least one heat exchange chamber interior and at least one second opening for guiding out an outflow of the at least one heat transfer fluid out of the at least one heat exchange chamber interior during a charging process, wherein the at least one second opening is used for guiding in an inflow of the at least one heat transfer fluid into the at least one heat exchange chamber interior and the at least one first opening is used for guiding out an outflow of the at least one heat transfer fluid out of the at least one heat exchange chamber interior during a discharging process;

at least one heat storage material is arranged in the at least one heat exchange chamber interior such that a heat exchange flow of the at least one heat transfer fluid through the at least one heat exchange chamber interior causes a heat exchange between the at least one heat storage material and the at least one heat transfer fluid;

at least one bypass duct for piping a bypass heat transfer fluid having a temperature less than the at least one heat exchange fluid without being guided through the exchange chamber interior; and at least one fluid mixing station for mixing the at least one heat transfer fluid coming from the heat exchange chamber interior and the bypass heat transfer fluid which is piped through the bypass duct, wherein the at least one fluid mixing station is configured to control, during the discharging process, a discharge temperature of the mixed at least one heat transfer fluid and the bypass heat transfer fluid so that the temperature of the mixed at least one heat transfer fluid and the bypass heat transfer fluid remains constant.

7. The heat exchange system according to claim 6, wherein the at least one fluid mixing station comprises at least one valve.

8. The heat exchange system according to claim 6, further comprising at least one charging unit for heating the at least one heat transfer fluid during a charging process.

9. The heat exchange system according to claim 8, wherein the at least one charging unit comprises at least one electrical heating device which is selected from the group consisting of a resistance heater, an inductive heater, an emitter of electromagnetic radiation, and a heat pump.

10. A method of operating a heat exchange system, comprising:
  initiating a charging process,
    wherein the charging process includes flowing a heat transfer fluid through a heat exchange chamber having a heat storage material, wherein flowing of the heat transfer fluid through the heat exchange chamber results in a heat exchange from the heat transfer fluid to the heat storage material;
  initiating a discharging process,
    wherein the discharging process includes flowing a first portion of the heat transfer fluid through the heat exchange chamber, wherein flowing of the first portion of the heat transfer fluid through the heat exchange chamber results in a heat exchange from the heat storage material to the first portion of the heat transfer fluid,
    wherein the discharging process further includes flowing a second portion of the heat transfer fluid through a bypass duct, such that the second portion of the heat transfer fluid does not pass through the heat exchange chamber, and
    mixing the first portion of the heat transfer fluid, after the heat exchange from the heat storage material to the first portion of the heat transfer fluid, with the second portion of the heat transfer fluid,
    wherein the mixing of the first portion of the heat transfer fluid with the second portion of the heat transfer fluid results in a discharge heat transfer fluid having a constant temperature throughout the discharging process.

11. The method of operating a heat exchange system of claim 10, wherein the discharge heat transfer fluid is used to power a steam generator.

12. The method of operating a heat exchange system of claim 11, wherein the constant temperature is a set temperature for the steam generator.

13. The method of operating a heat exchange system of claim 12, wherein the constant temperature is maintained until the discharge heat transfer fluid can no longer be maintained at the set temperature for the steam generator.

* * * * *